United States Patent
Sasaoka et al.

(10) Patent No.: US 9,244,217 B2
(45) Date of Patent: Jan. 26, 2016

(54) BI-DIRECTIONAL OPTICAL COMMUNICATION METHOD AND MULTI-CORE OPTICAL FIBER

(71) Applicant: SUMITOMO ELECTRIC INDUSTRIES, LTD., Osaka-shi, Osaka (JP)

(72) Inventors: Eisuke Sasaoka, Yokohama (JP); Masayuki Shigematsu, Yokohama (JP); Tetsuya Hayashi, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 51 days.

(21) Appl. No.: 13/671,928

(22) Filed: Nov. 8, 2012

(65) Prior Publication Data

US 2013/0129292 A1 May 23, 2013

Related U.S. Application Data

(60) Provisional application No. 61/657,156, filed on Jun. 8, 2012.

(30) Foreign Application Priority Data

Nov. 11, 2011 (JP) .................. 2011-247508

(51) Int. Cl.
*G02B 6/42* (2006.01)
*G02B 6/02* (2006.01)
*H04B 10/2581* (2013.01)

(52) U.S. Cl.
CPC .......... *G02B 6/02042* (2013.01); *G02B 6/4246* (2013.01); *H04B 10/2581* (2013.01)

(58) Field of Classification Search
CPC ................................. G02B 6/02042
USPC ................................. 385/126, 127
See application file for complete search history.

(56) References Cited

U.S. PATENT DOCUMENTS 4,070,091 A * 1/1978 Taylor et al. ............... 385/31
4,730,886 A * 3/1988 Hicks ......................... 385/12

(Continued)

FOREIGN PATENT DOCUMENTS

EP 1 909 366 4/2008
JP S59-003026 1/1984

(Continued)

OTHER PUBLICATIONS

English-language translation of International Preliminary Report on Patentability (IPRP) dated May 22, 2014 that issued in WO Patent Application No. PCT/JP2012/078364.

(Continued)

*Primary Examiner* — Ryan Lepisto
*Assistant Examiner* — Mary El Shammaa
(74) *Attorney, Agent, or Firm* — Drinker Biddle & Reath LLP (57) ABSTRACT

The present invention relates to a multi-core optical fiber applicable to an optical transmission line of bi-directional optical communication and a bi-directional optical communication method. The multi-core optical fiber has plural cores in a common cladding. Signal light is transmitted in a first direction through an arbitrary core among the cores, whereas the signal light is transmitted in a second direction opposite to a first direction, through all the nearest-neighbor cores to the arbitrary core.

5 Claims, 9 Drawing Sheets

(56) References Cited

U.S. PATENT DOCUMENTS

| | | | |
|---|---|---|---|
| 5,566,196 A * | 10/1996 | Scifres | 372/6 |
| 6,041,154 A | 3/2000 | Ono et al. | |
| 6,278,818 B1 * | 8/2001 | Laming et al. | 385/37 |
| 6,496,303 B1 * | 12/2002 | Fleming | 359/337.1 |
| 2002/0197037 A1 * | 12/2002 | Bailey et al. | 385/123 |
| 2004/0252958 A1 | 12/2004 | Abu-Ageel | |
| 2008/0173392 A1 * | 7/2008 | Tanaka et al. | 156/272.8 |

FOREIGN PATENT DOCUMENTS

| | | |
|---|---|---|
| JP | S60-263905 | 12/1985 |
| JP | H5-299733 | 11/1993 |
| JP | 2000-292627 | 10/2000 |
| JP | 2001-033636 | 2/2001 |
| JP | 2001242348 A * | 9/2001 |
| JP | 2010-181795 | 8/2010 |
| JP | 2011-018013 | 1/2011 |
| JP | 2011-209702 | 10/2011 |
| JP | 2012-203036 | 10/2012 |
| JP | 2012-215696 | 11/2012 |
| WO | WO 02/08807 | 1/2002 |
| WO | 2009/136925 | 11/2009 |
| WO | WO 2011/004836 | 1/2011 |
| WO | WO 2011-102191 | 8/2011 |

OTHER PUBLICATIONS

Bing Yao et al., "Development of Optical Dispersion Management Multi-Core Fiber", Institute of Electronics, Information, and Communication Engineers, vol. 111, No. 69, May 19, 2011, p21-p24.

* cited by examiner

BI-DIRECTIONAL OPTICAL COMMUNICATION METHOD AND MULTI-CORE OPTICAL FIBER

This application claims the benefit of U.S. Provisional Application No. 61/657,156 filed Jun. 8, 2012, which is incorporated by reference herein in its entirety.

BACKGROUND OF THE INVENTION

1. Field of the Invention

The present invention relates to a method of performing bi-directional optical communication by using a multi-core optical fiber as an optical transmission line, and relates to a multi-core optical fiber suitably used in the bi-directional optical communication.

2. Related Background of the Invention

As compared with optical communication which uses a standard single core optical fiber as an optical transmission line, in optical communication which uses a multi-core optical fiber as an optical transmission line, there is an advantage that a construction cost and maintenance cost per capacity are cheap since large amount of information can be transmitted/received by a smaller number of optical fibers.

SUMMARY OF THE INVENTION

The present inventors have examined conventional multi-core optical fibers, and as a result, have discovered the following problems.

That is, in the optical communication using a multi-core optical fiber as an optical transmission line, inter-core crosstalk becomes a factor for performance degradation. However, heretofore, there has been proposed an invention trying to cope with performance degradation due to the inter-core crosstalk by the improvement of a structure of the multi-core optical fiber, but there is not know an invention trying to cope with it from a viewpoint of an optical communication method.

The present invention has been developed to eliminate the problems described above. It is an object of the present invention to provide a method of performing bi-directional optical communication by using a multi-core optical fiber as an optical transmission line, the method being capable of reducing a crosstalk among cores. In addition, the object is to provide a multi-core optical fiber suitably used in such bi-directional optical communication.

A bi-directional optical communication method according to the present invention performs bi-directional optical communication by using, as an optical transmission line, a multi-core optical fiber having four or more of cores in a common cladding. In a bi-directional optical communication method according to a first aspect, one-way optical communication is performed in each of the cores of the multi-core optical fiber. At this time, signal light is transmitted in a first direction through an arbitrary core among the cores of the multi-core optical fiber, whereas the signal light is transmitted in a second direction opposite to the first direction, through all the nearest-neighbor cores with respect to the arbitrary core. Note that, dummy cores which do not contribute to optical communication are excluded from the above cores.

In addition, as a second aspect applicable to the first aspect, it is preferable that the multi-core optical fiber has an even number of cores in the cladding. As a third aspect applicable to at least one of the first and second aspects, the cores may be arranged at lattice points of a square lattice, in a cross-section perpendicular to a central axis of the multi-core optical fiber.

As a fourth aspect applicable to at least one of the first to third aspects, the cores may be arranged at regular intervals on a circumference of a common circle, in the cross-section perpendicular to the central axis of the multi-core optical fiber. As a fifth aspect applicable to at least one of the first to fourth aspects, it is preferable that two cores nearest-neighboring each other among the cores have substantially the same structure.

As a multi-core optical fiber applicable to an optical transmission line of a bi-directional optical communication method according to at least one of the first to fifth aspects, a multi-core optical fiber according to a sixth aspect has plural cores in a common cladding. The multi-core optical fiber according to the sixth aspect, while having a shape extending along a central axis, has a first end face and a second end face opposing the first end face. In particular, in the sixth aspect, each of the cores has an input end into which the signal light is inputted, and an output end from which the signal light is outputted. Additionally, in the multi-core optical fiber, the input end of each of the cores is arranged on the first end face or the second end faces, and the output end of each of the cores is arranged on the first end face or the second end faces so that the signal light is transmitted in a first direction through the arbitrary core among the cores, whereas the signal light is transmitted in a second direction opposite to the first direction, through all the nearest-neighbor cores with respect o the arbitrary core.

The multi-core optical fiber according to a seventh aspect applicable to the sixth aspect is also a multi-core optical fiber having plural cores in a common cladding. In the seventh aspect, in a cross-section perpendicular to a central axis of the multi-core optical fiber, the cores are arranged at other lattice points excluding one specific lattice point among lattice points of a square lattice, the square lattice having an odd number of lattice points. In addition, as an eighth aspect applicable to the seventh aspect, it is preferable that a marker for specifying arrangement of the cores is provided in the vicinity of the specific lattice point.

The multi-core optical fiber according to a ninth aspect applicable to the sixth aspect is also a multi-core optical fiber having plural cores in a common cladding. In the ninth aspect, in a cross-section perpendicular to a central axis of the multi-core optical fiber, each of the cores is arranged on one of circumferences of first and second circles having a common center while cores on each of the circumferences among the cores are arranged at regular intervals. In addition, when a core arrangement interval on the circumference of the first circle is a first value, a core arrangement interval on the circumferences of the second circle is a second value, and a radius difference between the first and the second circles is a third value, the maximum among the first to third values is not more than twice a minimum value among the first to third values. Note that, as a 10th aspect applicable to at least one of the sixth to ninth aspects, it is preferable that two cores nearest-neighboring each other among the cores have substantially the same structure.

The bi-directional optical communication method according to the present invention, as a 11th aspect, performs bi-directional optical communication by using, as an optical transmission line, a multi-core optical fiber according to at least one of the sixth to tenth aspects. In the 11th aspect, one-way optical communication is performed in each of plural cores of the multi-core optical fiber. At this time, signal light is transmitted in a first direction through an arbitrary core among the cores of the multi-core optical fiber, whereas the signal light is transmitted in a second direction opposite to the first direction, through all the nearest-neighbor cores with respect to the arbitrary core.

DESCRIPTION OF THE PREFERRED EMBODIMENTS

In the following, with reference to the accompanying drawings, configurations for carrying out the present invention will be described in detail. Note that, in description of the drawings, the same symbol is given to the same component, and overlapped description is omitted.

(First Embodiment)

Figure 1:
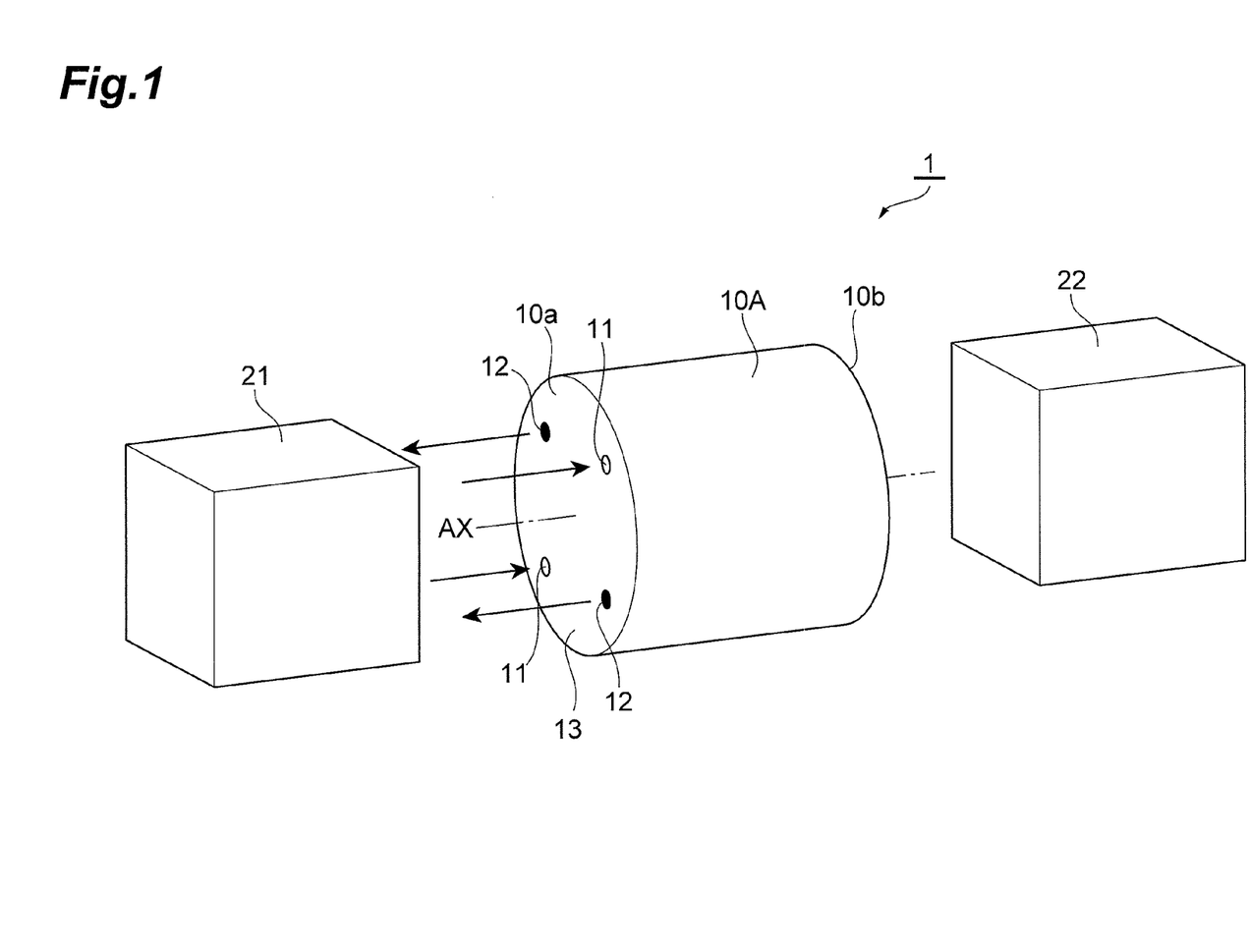
FIG. 1 is a view showing a schematic configuration example of a bi-directional optical communication system according to the first embodiment.

FIG. 1 is a view showing a schematic configuration example of a bi-directional optical communication system according to a first embodiment. A bi-directional optical communication system 1 conceptually shown in FIG. 1 comprises a multi-core optical fiber 10A and bi-directional optical transmission/reception devices 21, 22, and performs bi-directional optical communication between the optical transmission/reception device 21 and optical transmission/reception device 22 by using the multi-core optical fiber 10A as an optical transmission line. Note that the multi-core optical fiber 10A, while having a shape extending along a central axis AX, has a first end face 10a, and a second end face 10b opposing the first end face 10a. An input end or an output end of each of a plurality of cores 11, 12 included in the multi-core optical fiber 10A is arranged on one of the first and second end faces 10a, 10b.

Figure 2:
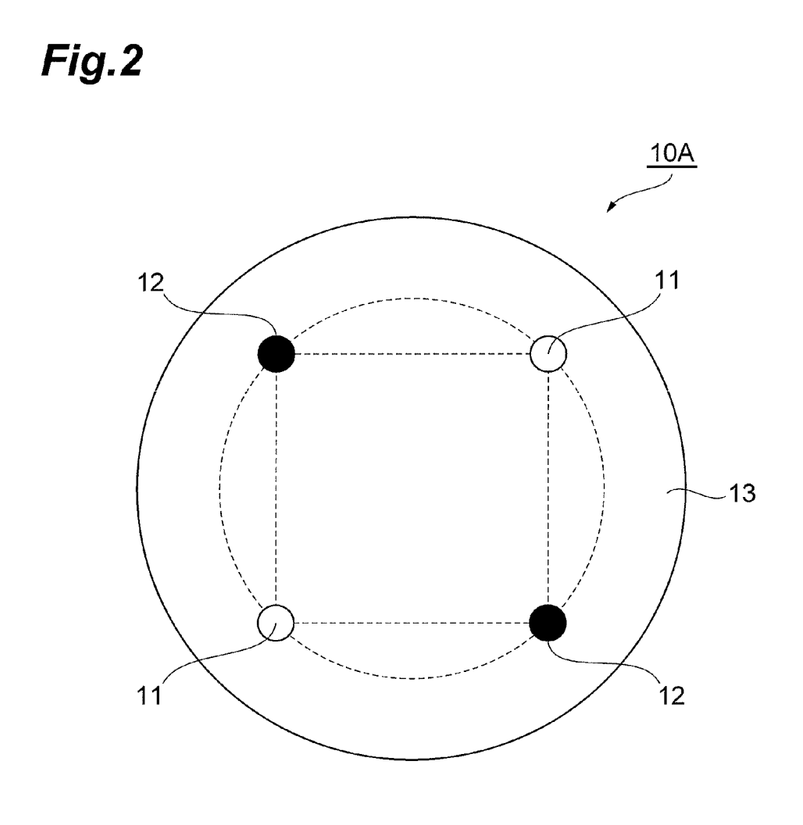
FIG. 2 is a cross-sectional view of a multi-core optical fiber 10A used as an optical transmission line in the bi-directional optical communication method according to the first embodiment.

FIG. 2 is a cross-sectional view (corresponding to a plane perpendicular to the central axis AX) of the multi-core optical fiber 10A used as the optical transmission line in the bi-directional optical communication method according to the first embodiment. Note that FIG. 2 and the subsequent cross-sectional views show a cross section perpendicular to a fiber axis. Additionally, in FIG. 2 and the subsequent cross-sectional views, for convenience of explanation thereof, an auxiliary line for describing arrangement of cores is shown by a dotted line.

The multi-core optical fiber 10A has four cores 11, 12 within a common cladding 13. Each refractive index of the four cores 11, 12 is higher than a refractive index of the cladding 13. A center position of a square of a dotted line shown within FIG. 2 is in agreement with a center position of the cladding 13, and a length of one side of the square is 50 μm, and the cores 11, 12 are arranged at four vertices of the square. In other words, a center position of a circle of a dotted line shown within FIG. 2 is in agreement with the center position of the cladding 13, and a radius of the circle is 35.4 μm, and the cores 11, 12 are arranged on a circumference of the circle at regular intervals. A diameter of each of the cores 11, 12 is 8 μm, and a relative refractive index difference between each of the cores 11, 12 and the cladding 13 is 0.4%, and a diameter of the cladding 13 is 125 μm.

In the multi-core optical fiber 10A, each of the two cores 11 transmits signal light in one direction from the optical transmission/reception device 21 to the optical transmission/reception device 22. Each of the two cores 12 transmits the signal light in one direction from the optical transmission/reception device 22 to the optical transmission/reception device 21. The cores 11, 12 which are located at the positions closest to each other among the four cores 11, 12 make signal light be transmitted in the direction opposite to each other. It is preferred that the cores 11, 12 located at the positions closest to each other have substantially the same structure, which is, in this case, advantageous in terms of being easily manufacturable or connection loss reduction. Note that, in FIG. 2 and subsequent cross-sectional views (FIGS. 5 to 9), the core 11 which transmits the signal light from the optical transmission/reception device 21 to the optical transmission/reception device 22 in one direction is indicated with a white circular area, and the core 12 which transmits the signal light from the optical transmission/reception device 22 to the optical transmission/reception device 21 in one direction is indicated with a black circular area.

In the present embodiment, as to the cores 11, 12 which are located at the positions closest to each other, the center interval thereof is 50 μm, but such nearest-neighbor cores 11, 12 transmit the signal light in the directions opposite to each other. Therefore, as compared with a case where the cores located at the positions closest to each other transmit the signal light in the same direction, the inter-core crosstalk is reduced. In addition, as to the two cores 11 which transmit the signal light in the same direction, or the two cores 12 which transmit the signal light in the same direction, the center interval thereof is 70.7 μm, and is expanded more greatly than the nearest-neighbor core interval (50 μm). As a result, in the multi-core optical fiber 10A, the inter-core crosstalk is also reduced.

Moreover, by providing a portion such as a trench, which suppresses leakage of light into adjacent cores, in the cladding 13 near the cores 11, 12, the inter-core crosstalk can be further reduced, or a core interval can be further narrowed while the crosstalk is maintained low.

Note that, in FIG. 1, spaces exist between the multi-core optical fiber 10A and the optical transmission/reception device 21 and between the multi-core optical fiber 10A and the optical transmission/reception device 22, and there is described a configuration in which light propagates in the spaces. However, the multi-core optical fiber 10A and the optical transmission/reception devices 21, 22 may be coupled optically. The cores 11, 12 of the multi-core optical fiber 10A and light emitting elements or light receiving elements of the optical transmission/reception devices 21, 22 may have a configuration in which they make direct contact with each other, or may have a configuration in which they are coupled via optical waveguides. In addition, elements such as an isolator or the like each of which attenuates only light traveling toward any one of the light emitting elements, may be respectively inserted between the cores 11 of the multi-core optical fiber 10A and one of the light emitting elements and between the cores 12 of the multi-core optical fiber 10A and the other of the light emitting elements. The insertion of such elements for attenuation is effective in preventing the destabilization of operation of a light emitting element that is caused by crosstalk light from neighboring cores reaching the light emitting element.

Figure 3:
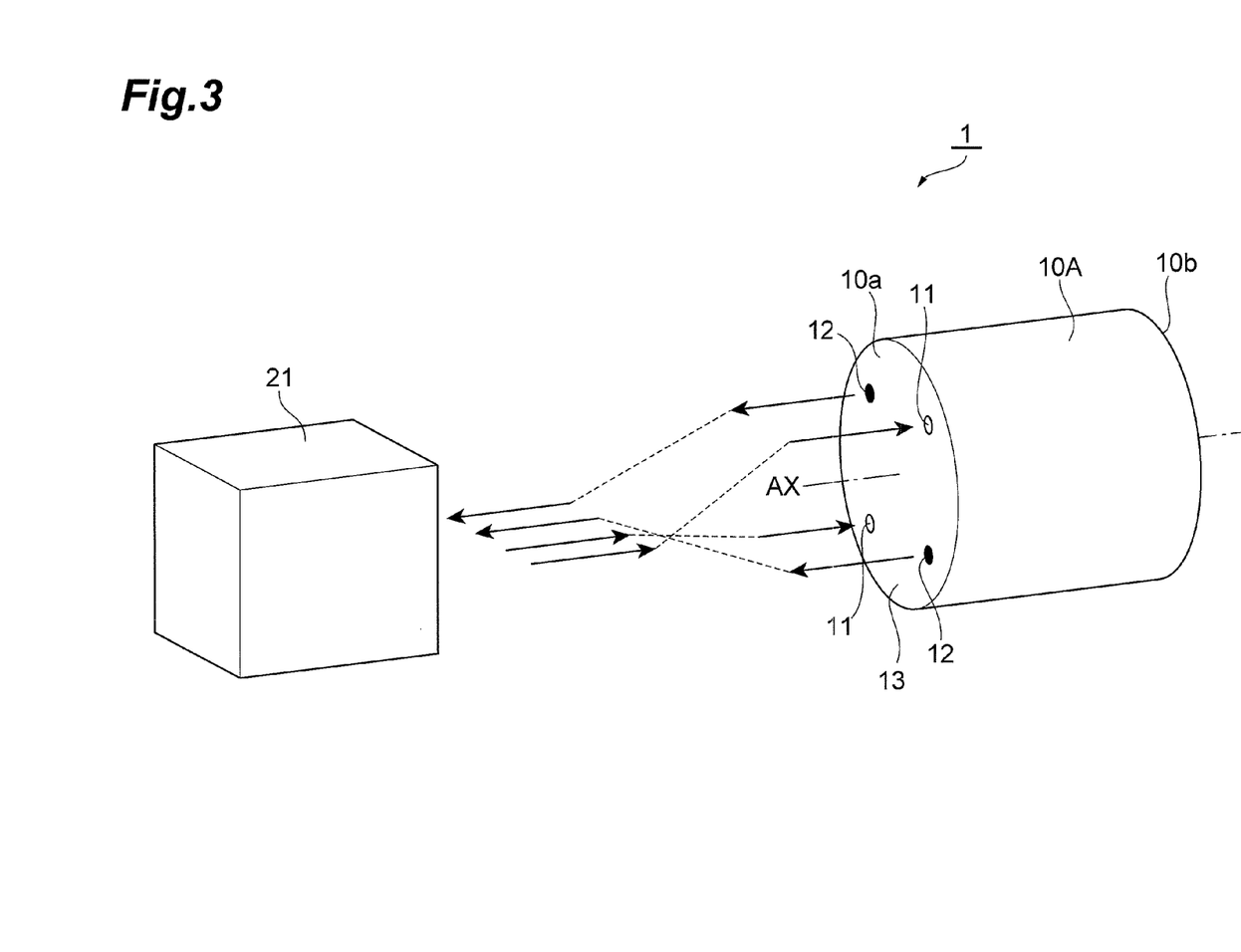
FIG. 3 is a view showing another schematic configuration example of the bi-directional optical communication system according to the first embodiment.

In the configuration of the optical communication system shown in FIG. 1, in accordance with a core arrangement of the multi-core optical fiber 10A, incidence/emission portions of each of the optical transmission/reception devices 21, 22 have been arranged on four vertices of a square. However, the present invention is not limited to this. As shown in FIG. 3, the incidence and emission portions of the optical transmission/reception device 21 are arranged on a straight line, and the cores of the multi-core optical fiber 10A are arranged on four vertices of the square, and the case where the both arrangements are different from each other is also considered.

Figure 4:
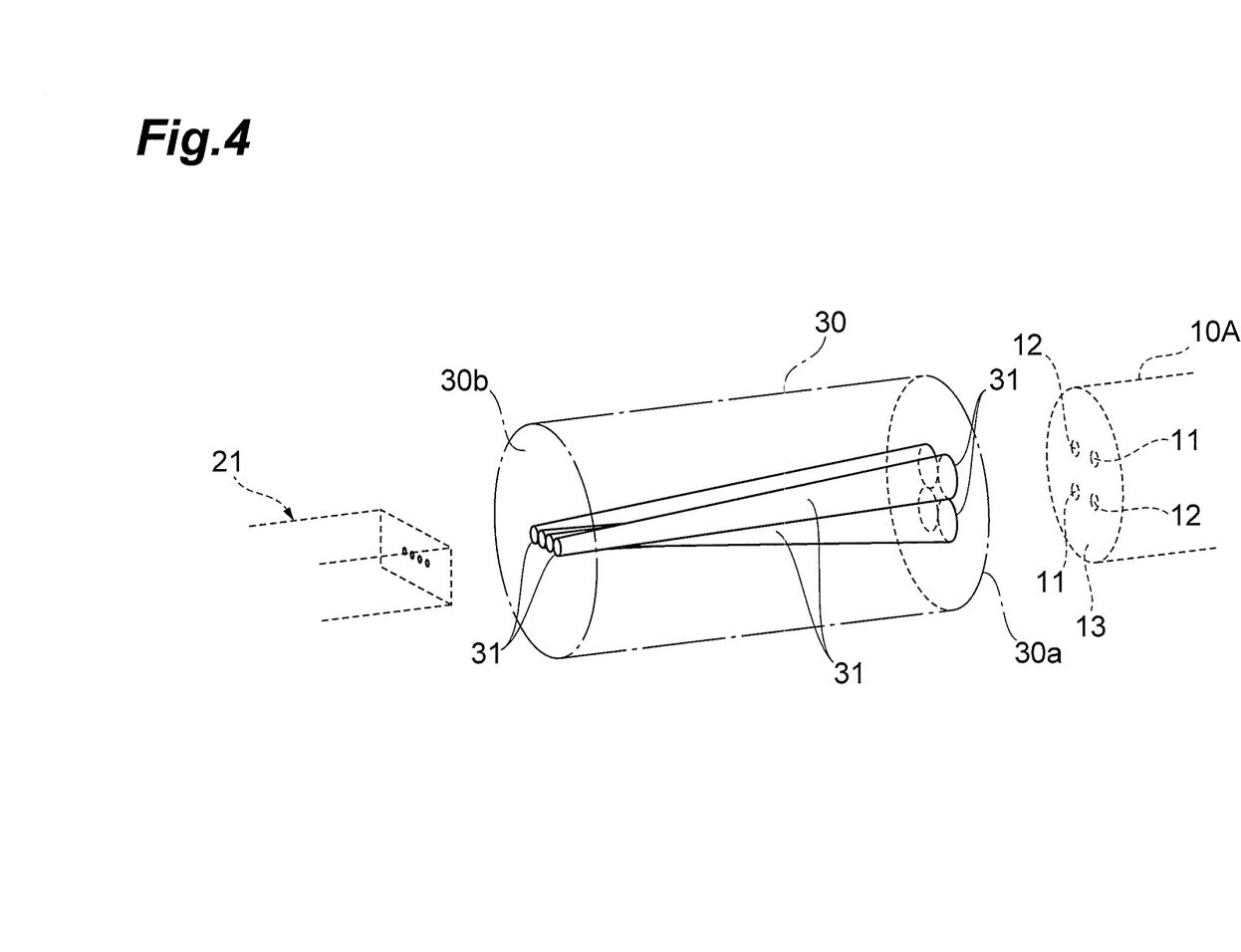
FIG. 4 is a view for explaining an optical connection member 30 inserted between an optical transmission/reception device and a multi-core optical fiber.

In this case, an optical connection member 30 for arrangement conversion as shown in FIG. 4 may be inserted between the optical transmission/reception device 21 and the multi-core optical fiber 10A. The optical connection member 30 has four cores 31 which extend between an end face 30a and an end face 30b. In the end face 30a facing the multi-core optical fiber 10A, the cores 31 are arranged on four vertices of a square in accordance with the arrangement of the cores 11, 12 of the multi-core optical fiber 10A. In the end face 30b facing the optical transmission/reception device 21, the cores 31 are arranged on a straight line in accordance with the arrangement of the incidence and emission portions of the optical transmission/reception device 21. As shown in FIG. 4, it is preferable that in the optical transmission/reception device 21, two light emission portions are adjacent and at the same time, two light incidence portions are adjacent. In this case, a structure of the optical transmission/reception device 21 becomes simple, and it is effective in terms of downsizing of the optical transmission/reception device 21. The optical connection member 30 may not have a fiber configuration as shown in FIG. 4.

(Second Embodiment)

Figure 5:
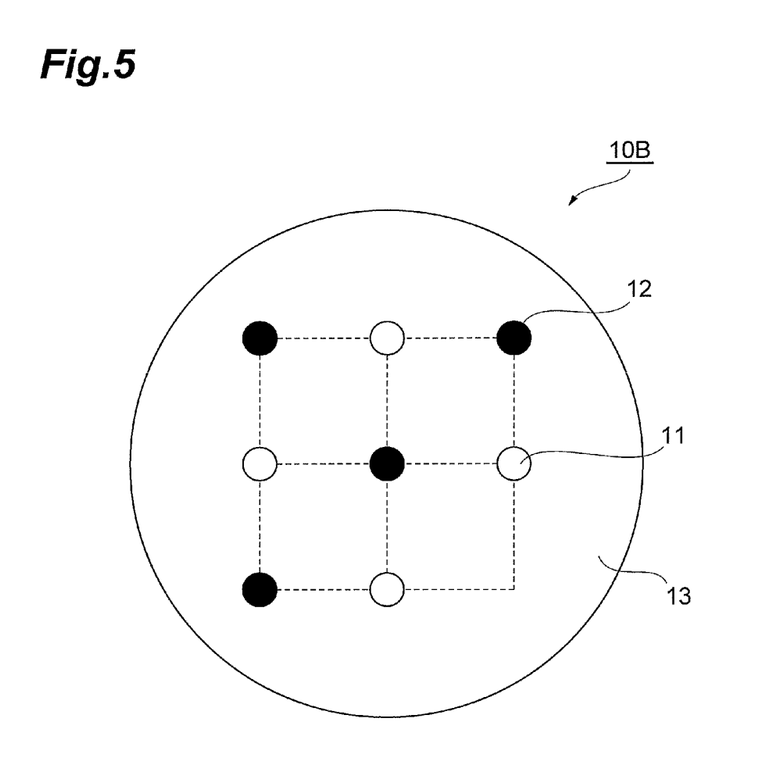
FIG. 5 is a cross-sectional view of a multi-core optical fiber 10B used as an optical transmission line in a bi-directional optical communication method according to a second embodiment.

FIG. 5 is a cross-sectional view of a multi-core optical fiber 10B used as an optical transmission line in the bi-directional optical communication method according to a second embodiment. Note that a cross-section shown in FIG. 5 corresponds to a plane perpendicular to a central axis of the multi-core optical fiber 10B in the same way as a cross-section (FIG. 2) of the multi-core optical fiber 10A according to the first embodiment.

The multi-core optical fiber 10B has eight cores 11, 12 in the common cladding 13. The eight cores 11, 12 are arranged at other lattice points excluding one specific lattice point located at a corner part among nine lattice points of a 3×3 square lattice of a dotted line shown in FIG. 5. A center position of the 3×3 square lattice is in agreement with the center position of the cladding 13, and a length of one side of each square is 40 µm. A diameter of each of the cores 11, 12 is 8 µm, and a relative refractive index difference between each of the cores 11, 12 and the cladding 13 is 0.4%, and a diameter of the cladding 13 is 150 µm.

In the present embodiment, as to the cores 11, 12 which are located at the positions closest to each other, the center interval thereof is 40 µm, but such nearest-neighbor cores 11, 12 transmit the signal light in the directions opposite to each other. Therefore, as compared with a case where the cores located at the positions closest to each other transmit the signal light in the same direction, the inter-core crosstalk is reduced. In addition, as to the two cores 11 which transmit the signal light in the same direction, or the two cores 12 which transmit the signal light in the same direction, the center interval thereof is 56.6 µm, and is expanded more greatly than the nearest-neighbor core interval (40 µm). As a result, in the multi-core optical fiber 10B, the inter-core crosstalk is also reduced.

(Third Embodiment)

Figure 6:
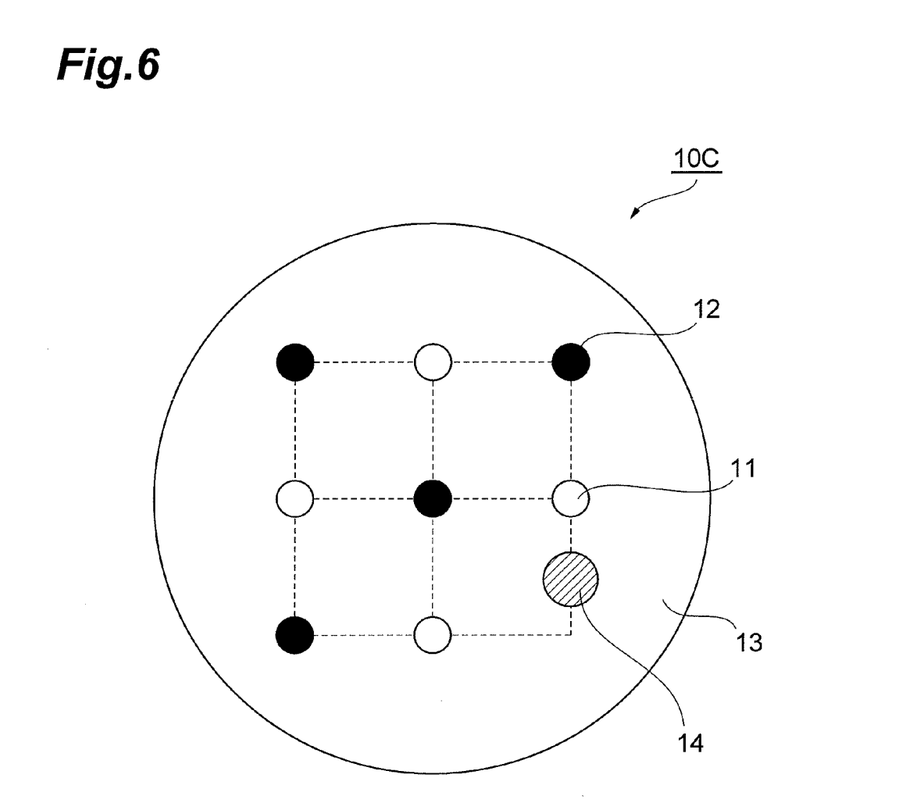
FIG. 6 is a cross-sectional view of a multi-core optical fiber 10C used as an optical transmission line in a bi-directional optical communication method according to a third embodiment.

FIG. 6 is a cross-sectional view of a multi-core optical fiber 10C used as an optical transmission line in the bi-directional optical communication method according to a third embodiment. Note that a cross-section shown in FIG. 6 corresponds to a plane perpendicular to a central axis of the multi-core optical fiber 10C in the same way as a cross-section (FIG. 2) of the multi-core optical fiber 10A according to the first embodiment.

The multi-core optical fiber 10C has eight cores 11, 12 in a common cladding 13, and furthermore also has a marker 14. The multi-core optical fiber 10C has a configuration in which the marker 14 has been added to the configuration of the multi-core optical fiber 10B.

The marker 14 is provided in the vicinity of the specific lattice point at which a core does not exist among nine lattice points of a 3×3 square lattice of a dotted line shown in FIG. 6. The marker 14 is provided, for example, at a position shifted, by approximately 15 µm, from the specific lattice point, to the side of a certain core 11 which is located at the position closest to the specific lattice point. By the fact that the marker 14 being provided in this manner, the arrangement of the eight cores 11, 12 can be specified. Meanwhile, it is preferable that the marker 14 is composed of material having a refractive index lower than the refractive index of the cladding 13 so as not to function as a pseudo-core.

(Fourth Embodiment)

Figure 7:
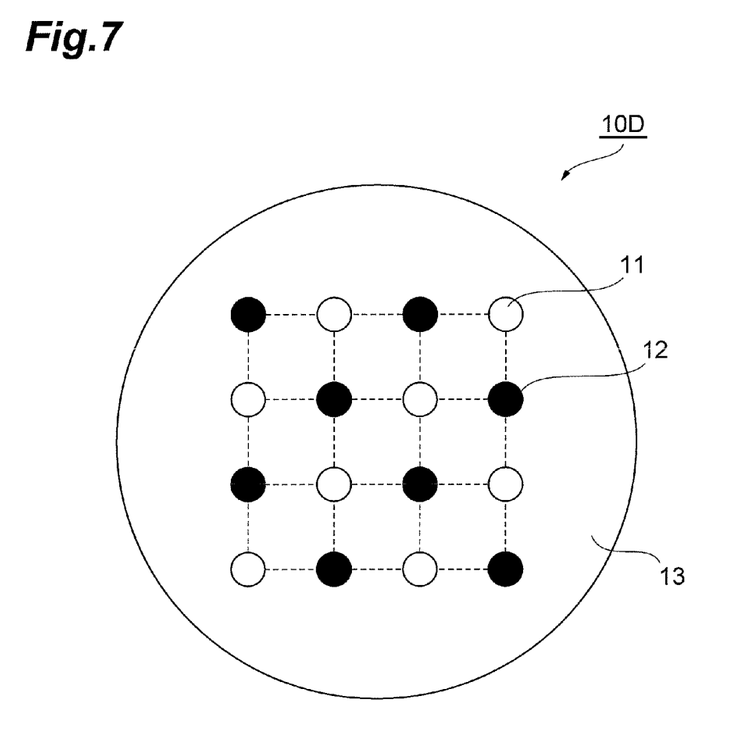
FIG. 7 is a cross-sectional view of a multi-core optical fiber 10D used as an optical transmission line in a bi-directional optical communication method according to a fourth embodiment.

FIG. 7 is a cross-sectional view of a multi-core optical fiber 10D used as an optical transmission line in the bi-directional optical communication method according to a fourth embodiment. Note that a cross-section shown in FIG. 7 corresponds to a plane perpendicular to a central axis of the multi-core optical fiber 10D in the same way as a cross-section (FIG. 2) of the multi-core optical fiber 10A according to the first embodiment.

The multi-core optical fiber 10D has sixteen cores 11, 12 in a common cladding 13. The sixteen cores 11, 12 are arranged at lattice points of a 4×4 square lattice of a dotted line shown in FIG. 7. A center position of the 4×4 square lattice is in agreement with the center position of the cladding 13, and a length of one side of each square is 25 µm. A diameter of each of the cores 11, 12 is 6 µm, and a relative refractive index difference between each of the cores 11, 12 and the cladding 13 is 0.6%, and a diameter of the cladding 13 is 150 µm.

In the present embodiment, as to the cores 11, 12 which are located at the position closest to each other, the center interval thereof is 25 µm, but such nearest-neighbor cores 11, 12 transmit the signal light in the directions opposite to each other. Therefore, as compared with a case where the cores located at the positions closest to each other transmit the signal light in the same direction, the inter-core crosstalk is reduced. In addition, as to the two cores 11 which transmit the signal light in the same direction, or the two cores 12 which transmit the signal light in the same direction, the center interval thereof is 35.3 μm, and is expanded more greatly than the nearest-neighbor core interval (25 μm). As a result, in the multi-core optical fiber 10D, the inter-core crosstalk is also reduced.

(Fifth Embodiment)

Figure 8:
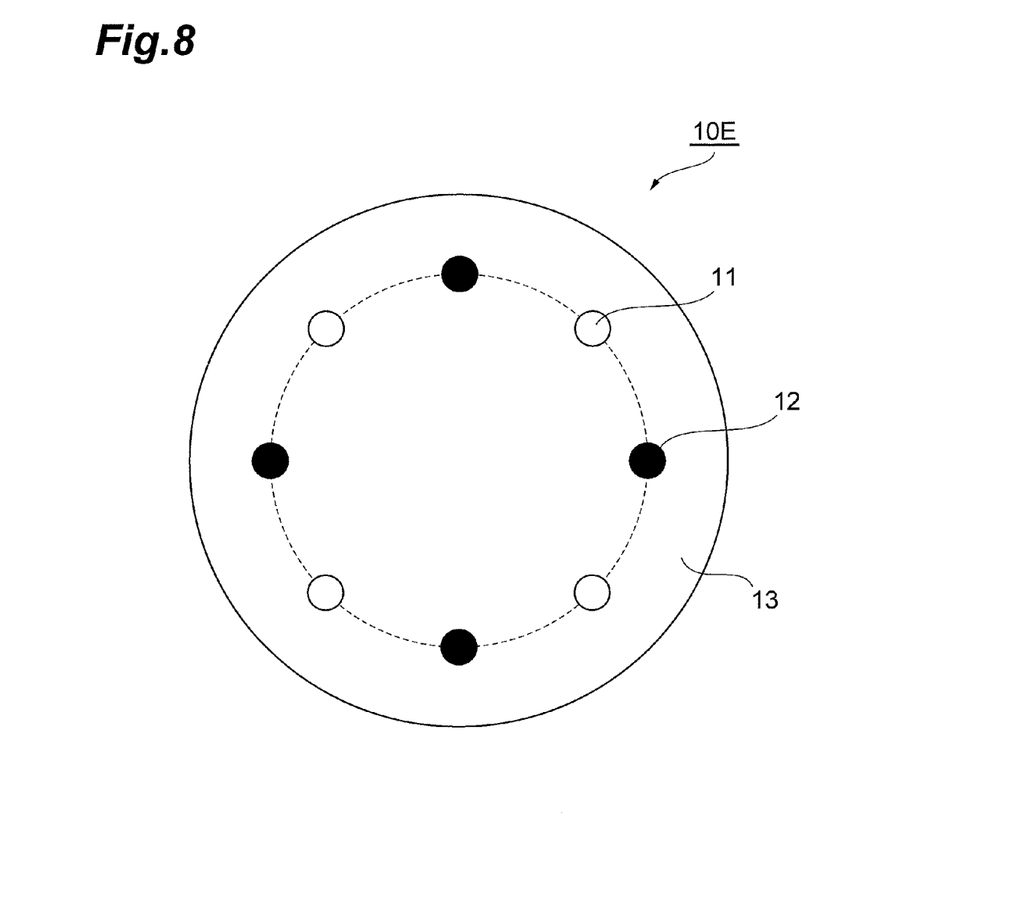
FIG. 8 is a cross-sectional view of a multi-core optical fiber 10E used as an optical transmission line in a bi-directional optical communication method according to a fifth embodiment.

FIG. 8 is a cross-sectional view of a multi-core optical fiber 10E used as an optical transmission line in the bi-directional optical communication method according to a fifth embodiment. A cross-section shown in FIG. 8 corresponds to a plane perpendicular to a central axis of the multi-core optical fiber 10E in the same way as a cross-section (FIG. 2) of the multi-core optical fiber 10A according to the first embodiment.

The multi-core optical fiber 10E has eight cores 11, 12 in the common cladding 13. The eight cores 11, 12 are arranged at regular intervals on a circumference of a circle of a dotted line shown in FIG. 8. A center position of the circle is in agreement with the center position of the cladding 13, and a radius of the circle is 52.3 μm. A diameter of each of the cores 11, 12 is 8 μm, and a relative refractive index difference between each of the cores 11, 12 and the cladding 13 is 0.4%, and a diameter of the cladding 13 is 150 μm.

In the present embodiment, as to the cores 11, 12 which are located at the positions closest to each other, the center interval thereof is 40 μm, but such nearest-neighbor cores 11, 12 transmit the signal light in the directions opposite to each other. Therefore, as compared with a case where the cores located at the positions closest to each other transmit the signal light in the same direction, the inter-core crosstalk is reduced. In addition, as to the two cores 11 which transmit the signal light in the same direction, or the two cores 12 which transmit the signal light in the same direction, the center interval thereof is 73.9 μm, and is expanded more greatly than the closest core interval (40 μm). As a result, the inter-core crosstalk is also reduced.

(Sixth Embodiment)

Figure 9:
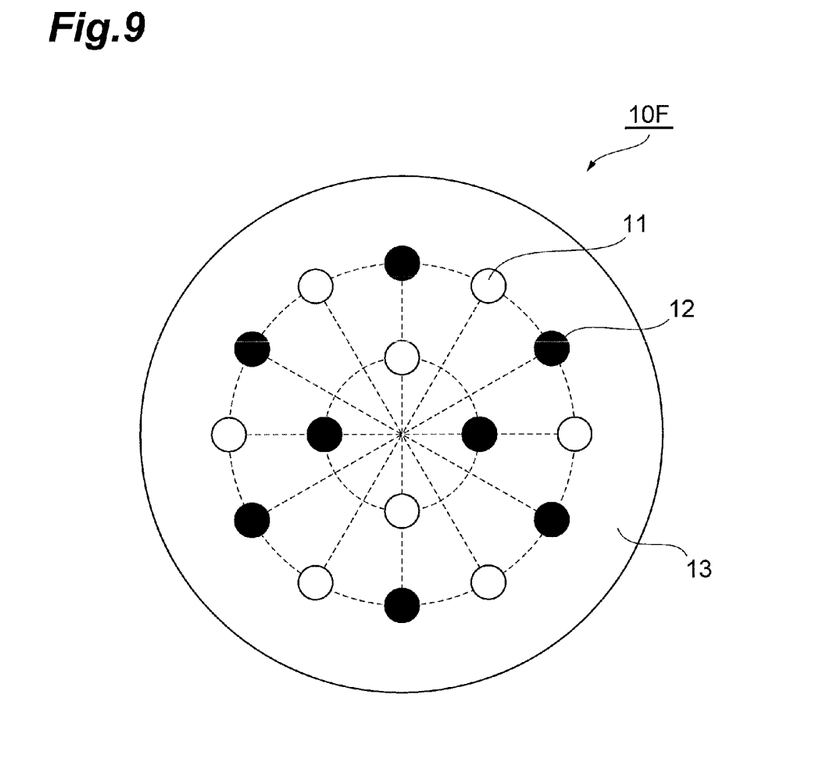
FIG. 9 is a cross-sectional view of a multi-core optical fiber 10F used as an optical transmission line in a bi-directional optical communication method according to a sixth embodiment.

FIG. 9 is a cross-sectional view of a multi-core optical fiber 10F used as an optical transmission line in the bi-directional optical communication method according to a sixth embodiment. A cross-section shown in FIG. 9 corresponds to a plane perpendicular to a central axis of the multi-core optical fiber 10F in the same way as a cross-section (FIG. 2) of the multi-core optical fiber 10A according to the first embodiment.

The multi-core optical fiber 10F has sixteen cores 11, 12 in a common cladding 13. Each of the cores 11, 12 is arranged on one of circumferences of two circles expressed by a dotted line shown in FIG. 9. Each of center positions of the inner circle and the outer circle is in agreement with the center position of the cladding 13. A radius of the inner circle is 19.1 μm, and the four cores 11, 12 are arranged at regular intervals on the circumference of the inner circle. A radius of the outer circle is 52.2 μm, and the twelve cores 11, 12 are arranged at regular intervals on the circumference of the outer circle. A diameter of each of the cores 11, 12 is 6 μm, and a relative refractive index difference between each of the cores 11, 12 and the cladding 13 is 0.6%, and a diameter of the cladding 13 is 150 μm. In addition, when a core arrangement interval on the circumference of the inner circle is a first value, a core arrangement interval on the circumference of the outer circle is a second value, and a radius difference between the inner and outer circles is a third value, the maximum value among the first to third values is not more than twice a minimum value among the first to third values.

In the present embodiment, on the circumference of each of the inner and outer circles, as to the cores 11, 12 located at the positions closest to each other, a center interval thereof is 27 μm, but such nearest-neighbor cores transmit the signal light in the direction opposite to each other. Therefore, as compared with a case where the cores located in the position closest to each other transmit the signal light in the same direction, the inter-core crosstalk is reduced. On the circumference of the inner circle, as to the two cores 11 which transmit the signal light in the same direction, or the two cores 12 which transmit the signal light in the same direction, a center interval thereof is 38.2 μm, and is expanded more greatly than the closest core interval (27 μm). As a result, the inter-core crosstalk is also reduced. Similarly, on the circumference of the outer circle, as to the two cores 11 which transmit the signal light in the same direction, or the two cores 12 which transmit the signal light in the same direction, a center interval thereof is 52.2 μm, and is expanded more greatly than the closest core interval (27 gm). Therefore, the inter-core crosstalk is reduced also by this configuration.

In addition, since a center interval between a core on the circumference of the inner circle and a core on the circumference of the outer circle which are located on the same radial line is 33.1 μm (that is, radius difference between the outer circle and the inner circle), the inter-core crosstalk is reduced by transmitting the signal light in the opposite directions in these cores. Note that a center interval between the cores which transmit the light in the same direction on the circumference of the outer circle and the circumference of the inner circle is 36.9 μm, and is expanded more than the center interval of the cores which are located on the same radial line.

According to the present invention, a crosstalk among cores can be reduced in the case where bi-directional optical communication is performed using the multi-core optical fiber as an optical transmission line.

What is claimed is:

1. A multi-core optical fiber having plural cores in a common cladding, the multi-core optical fiber having:
 a first end face; and
 a second end face opposing the first end face,
 wherein the cores are completely separated to each other through part of the common cladding.
 wherein each of the cores has an input end into which signal light is inputted, and an output end from which the signal light is outputted, and
 wherein the input end of each of the cores is arranged on the first end face or the second end faces, and the output end of each of the cores is arranged on the first end face or the second end faces so that two or more cores keeping an interval therebetween of not less than a predetermined interval among the cores individually transmit the signal in a first direction, whereas two or more cores keeping an interval therebetween of not less than the predetermined interval among the cores individually transmit the signal in a second direction opposite to the first direction.

2. The multi-core optical fiber according to claim 1, wherein two cores nearest-neighboring each other among the cores have substantially the same structure.

3. The multi-core optical fiber according to claim 1, wherein the predetermined interval is not less than 25 μm.

4. The multi-core optical fiber according to claim 1, wherein in a cross-section perpendicular to a central axis of the multi-core optical fiber, the cores are arranged in a lattice fashion.

5. The multi-core optical fiber according to claim 1, wherein in a cross-section perpendicular to a central axis of the multi-core optical fiber, the cores are arranged on one or more circles having a common center, respectively.

\* \* \* \* \*